United States Patent [19]

Shimomura

[11] Patent Number: 4,612,487
[45] Date of Patent: Sep. 16, 1986

[54] SYSTEM AND METHOD FOR CONTROLLING AN INDUSTRIAL ROBOT

[75] Inventor: Raiji Shimomura, Sakura, Japan

[73] Assignee: Hitachi, Ltd., Tokyo, Japan

[21] Appl. No.: 636,253

[22] Filed: Jul. 31, 1984

[30] Foreign Application Priority Data

Aug. 18, 1983 [JP] Japan .................................. 58-149627

[51] Int. Cl.$^4$ ............................................ G05B 19/42
[52] U.S. Cl. ..................................... 318/568; 364/513
[58] Field of Search ............... 318/568, 569, 600, 601; 364/513

[56] References Cited

U.S. PATENT DOCUMENTS

| | | | |
|---|---|---|---|
| 4,481,568 | 11/1984 | Inaba et al. | 318/568 X |
| 4,482,968 | 11/1984 | Inaba et al. | 318/568 X |
| 4,513,366 | 4/1985 | Munekata et al. | 318/568 X |
| 4,530,046 | 6/1985 | Munekata et al. | 318/568 X |

Primary Examiner—B. Dobeck
Attorney, Agent, or Firm—Beall Law Offices

[57] ABSTRACT

A system and method for controlling an industrial robot wherein an adjustable optional region of a robot movement which differs from an inherent movable region defining the outer limits of robot movement and which is contained within the inherent movable region, is set by loading numerical data representing the shape of a workpiece to be handled by the robot, into a controller for the robot. During operation, the objective of the robot is controlled by the numerical data and thereby limited in movement to the optional region within said inherent movable region. The operational region is set in a rectangular coordinate system different from the operating coordinate system inherent to the robot, thereby defining a robot movement space which can be visualized and readily discerned by an operator.

13 Claims, 11 Drawing Figures

SYSTEM AND METHOD FOR CONTROLLING AN INDUSTRIAL ROBOT

TECHNICAL FIELD

The present invention relates to a control system for industrial robots, and more particularly to a control system which satisfactorily ensures the saftey of an operator and the protection of an industrial robot when applied to any of the robots of the articulated type, the polar coordinate type, the cylindrical coordinate type, etcetera, wherein a so-called driving joint is constructed so as to perform a rotational motion.

BACKGROUND ART

Various operating aspects of robots have been known. In any robot of the articulated type, the polar coordinate type, or the cylindrical coordinate type, etcetera, wherein the driving joint performs a rotational motion among the various operation aspects, the operating regions of the robot are defined between the maximum and minimum operating angles along respective operating axes. The operable region of such robot within the combined operating regions results in a space of very complicated shape, and is often difficult for an operator to intuitively either visualize or understand.

A robot of the articulated type will be used as an example. The articulated type generally has three principal axes and a plurality of other axes around which its hands rotate. For instance, an articulated type robot has angular variation ranges based on three respective principal axes and angular variation ranges based on the two respective axes of a wrist. The movable region of the fore end of the wrist, which is based on the operations of the three principal axes among the aforementioned axes, defines a range of a spatially very complicated region.

In actuality, the movable ranges based on the two axes of the wrist are further superimposed on such region based on the three principal axes. Therefore, the motion of the point of the fore end of the wrist becomes more complicated, and a simple expression in two dimensions in nearly impossible.

Accordingly, the movable region of a robot of the type wherein the so-called driving joint performs a rotational motion, including the articulated type robot as stated above, cannot be immediately visualized by the operator. It is very difficult to conjecture beforehand the limits within which the point of the fore end of the wrist moves in case of actually operating the robot. With the prior-art control system of the robot, therefore, the fore end part of the wrist is moved to an unexpected position during the operation of the robot such as when in the teaching mode. This has undesirably resulted in the operator being endangered or the robot becoming damaged, although the operating speed is also a factor in such accidents.

SUMMARY OF THE INVENTION

An object of the present invention is to eliminate the disadvantages of the prior art described above, and to provide a control system for industrial robots in which the movable region of the robot can be readily visualized by an operator to satisfactorily assure the safety of the operator, and protection of the robot while, for example, the robot is in a teaching mode.

The present invention for accomplishing this object is characterized in that, in a movable region inherent in the particular robot, a three-dimensional space of any desired shape and size is permitted to be set, so as to confine within the three-dimensional space the motion of the robot during a predetermined operation such as teaching.

BRIEF DESCRIPTION OF THE DRAWINGS

Refer now to the accompanying drawings in which like reference symbols indicate the same or similar components, wherein:

FIGS. 1(i) and 1(ii) are diagrams explaining the movable region of an articulated type robot.

FIGS. 2 (i) and 2(ii) are diagrams explaining the region thereof rendered movable.

FIGS. 6(i) and 6(ii) are explanatory diagrams showing the operation of an embodiment of the present invention.

DETAILED DESCRIPTION OF THE INVENTION

Figure 1:
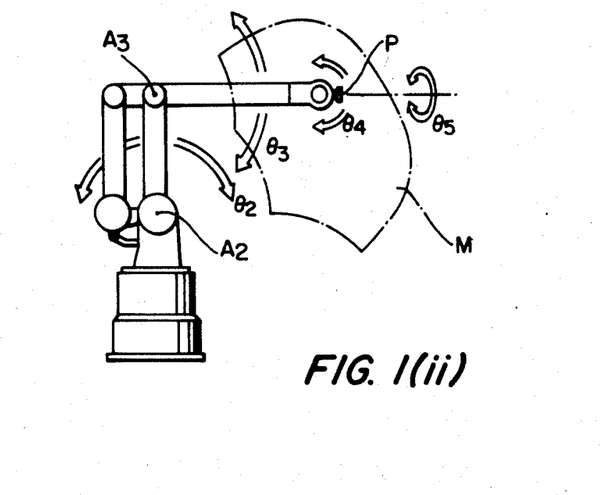
Figure 1I:
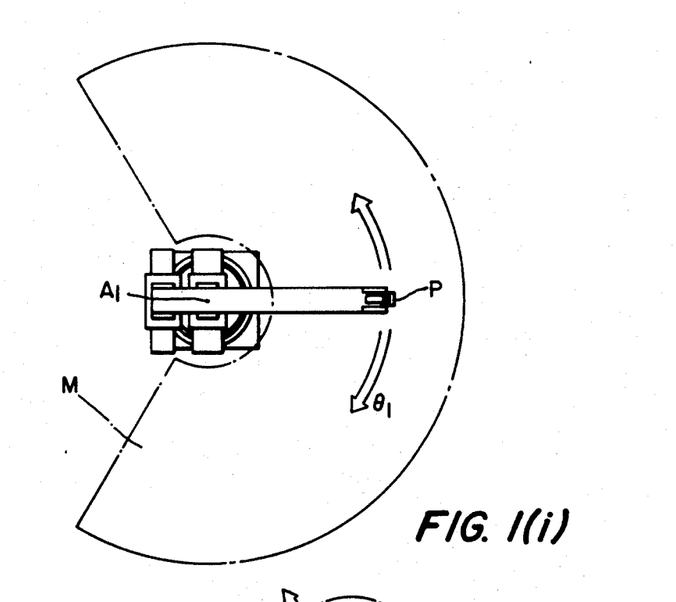

The articulated type robot generally has three principal axes and a plurality of axes around which its hands rotate. For instance, the articulated type robot shown in FIGS. 1(i) and 1(ii) has angular variation ranges $\theta_1$, $\theta_2$ and $\theta_3$ based on three respective principal axes $A_1$, $A_2$ and $A_3$ and angular variation ranges $\theta_4$ and $\theta_5$ based on the two respective axes of a wrist. The movable region of the fore end P of the wrist, which is based on the operations of the three principal axes $A_1$, $A_2$ and $A_3$ among the aforementioned axes, becomes a range M indicated by two-dot chain lines in these diagrams and becomes a spatially very complicated region. FIG. 1(i) is top plan view, while FIG. 1(ii) is a side view.

In actuality, the movable ranges $\theta_4$ and $\theta_5$ based on the two axes of the wrist are further superposed on such region based on the three principal axes. Therefore, the motion of the point P of the fore end of the wrist becomes more complicated, and a simple expression in two dimensions is next to impossible.

Accordingly, the movable region of a robot of the type wherein the so-called driving joint performs a rotational motion, including the articulated type robot as state above, cannot be immediately visualized by the operator. It is very difficult to conjecture beforehand the limits within which the point P of the fore end of the wrist moves in case of actually operating the robot. With the prior-art control system of the robot, therefore, the fore end part of the wrist is moved to an unexpected position during the operation of the robot such as during a teaching mode operation. This has undesirably led to the operator being endangered or the robot becoming damaged, although an operating speed is also a factor in such accidents.

Hereunder, embodiments of a control system for industrial robots according to the present invention will be described with reference to the drawings.

First, according to one embodiment of the present invention, before a teaching operation or the like is started, a workpiece which is an object to be handled is considered and a three-dimensional space in the shape of a rectangular perallelpiped including the workpiece is presupposed. Then a robot is set so as to be movable within only the presupposed three-dimensional space of the rectangular parallelepiped.

The foregoing articulated type robot usually has a so-called rectilinear interpolation function to permit the fore end part of the wrist to readily move along a rectilinear path. In such a robot, along with articulation angles necessary for moving the respective axes thereof, the positions of the fore end of the hand in a rectangular coordinate system (x, y and z coordinates) are normally computed and stored in a memory. Accordingly, if the movable region of the position of the fore end of the hand is set on the rectangular coordinate system is advance, it is very easy to check whether or not the position of an operational target point exists within the movable region on the rectangular coordinate sytsem.

Figure 2:
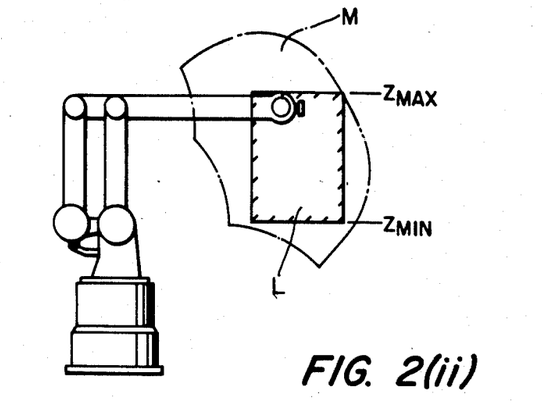
Figure 2I:
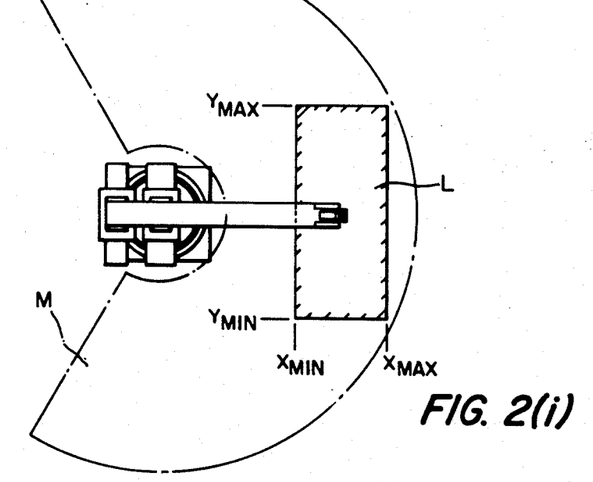

On the other hand, for an operator, an operational area including the workpiece to be handled can be supposed as the space of a rectangular parallelepiped if the movable region of the position of the fore end of the robot hand can be set as a region on the rectangular coordinate system. Therefore, the estimation of the operating area of the robot is easy, and the safety is thereby increased. By way of example, if the workpiece to be handled by the robot can be set within a hatched part L in FIG. 2, the fore end of the hand of the robot may be correspondingly set so as to operate within only the hatched part L, and the operator may usually pay attention to this range. While FIG. 2(i) shows one plane viewed from above the robot, the movable region L which is similarly oblong when viewed sidewards as shown in FIG. 2(ii), is set whereby the movable region becomes a rectangular parallelepiped which is a movable space readily discernible for the operator.

Figure 3:
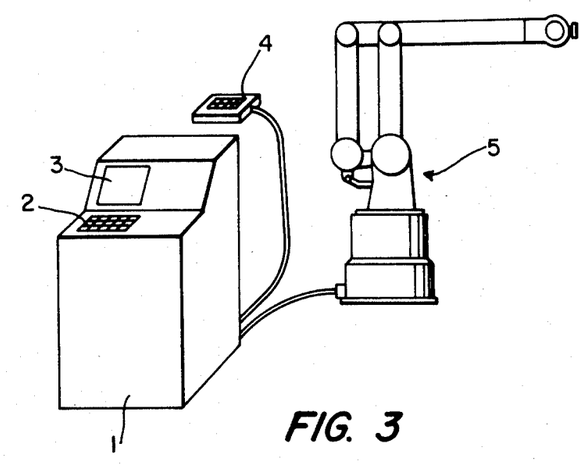
FIG. 3 is a system setup diagram showing an embodiment of a control apparatus for an industrial robot according to the present invention.

The present invention has been constructed under such recognition, and FIG. 3 shows one embodiment thereof. Referring to this figure, numeral 1 designates a robot control apparatus, numeral 2 operating keys, numeral 3 the display panel of a display unit, numeral 4 a teaching console, and numeral 5 a robot proper.

The robot control apparatus 1 functions to accept signals input through the operating keys 2 or the teaching console 4 and to operate the robot proper 5 on the basis of those signals. On that occasion, it also functions to indicate necessary operation commands and data on the display panel 3. In addition, this control apparatus 1 is furnished with a function module for setting a movable region. A key for calling the function module is assigned as one of the operating keys 2, and it serves as a movable region setting key. Functions and operations other than the movable region setting module and the movable region setting key are the same as those of a well-known robot control apparatus including the teaching console 4, and they shall therefore be omitted from the detailed description.

Next, the operations of this embodiment will be explained.

Figure 4:
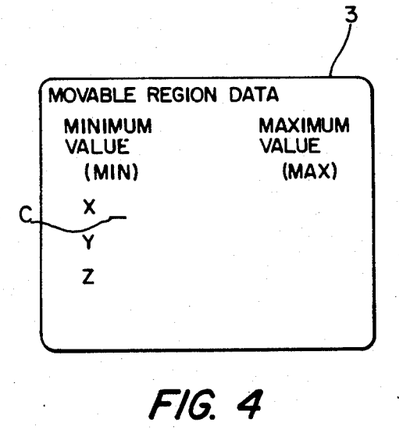
FIG. 4 is a diagram explaining a display panel in the embodiment.

First, when the movable region setting key providing among the operating keys 2 of the control apparatus 1 is depressed, a movable region setting screen as shown in FIG. 4 is indicated on the panel 3 of the display unit.

Subsequently, using a cursor C on the screen, data items X, Y and Z which express the movable region on a rectangular coordinate system are successively input to the control apparatus 1 through the operating keys 2. The data items, X, Y and Z at this time become data times $X_{MIN}$ and $X_{MAX}$, $Y_{MIN}$ and $Y_{MAX}$, and $Z_{MIN}$ and $Z_{MAX}$ which represent the movable region L in FIGS. 2(i) and 2(ii) in terms of the minimum values and maximum values on respective coordinate axes. Herein, regarding the coordinate axis as to which no data has been provided, the minimum and maximum of numerical values which can be set in the robot, that is, the data items of the points at which the unset coordinate axis intersects the two-dot chain lines in FIGS. 2(i) and 2(ii) are automatically set. Accordingly, even when the movable region is not set over a three-dimensional space, the robot operates by setting it in only two dimensions, for example, for only the X-axis and Y-axis, whereby the setting operation can be simplified.

When the six sorts of data have been thus set, they are stored in a memory within the control apparatus 1.

Figure 5:
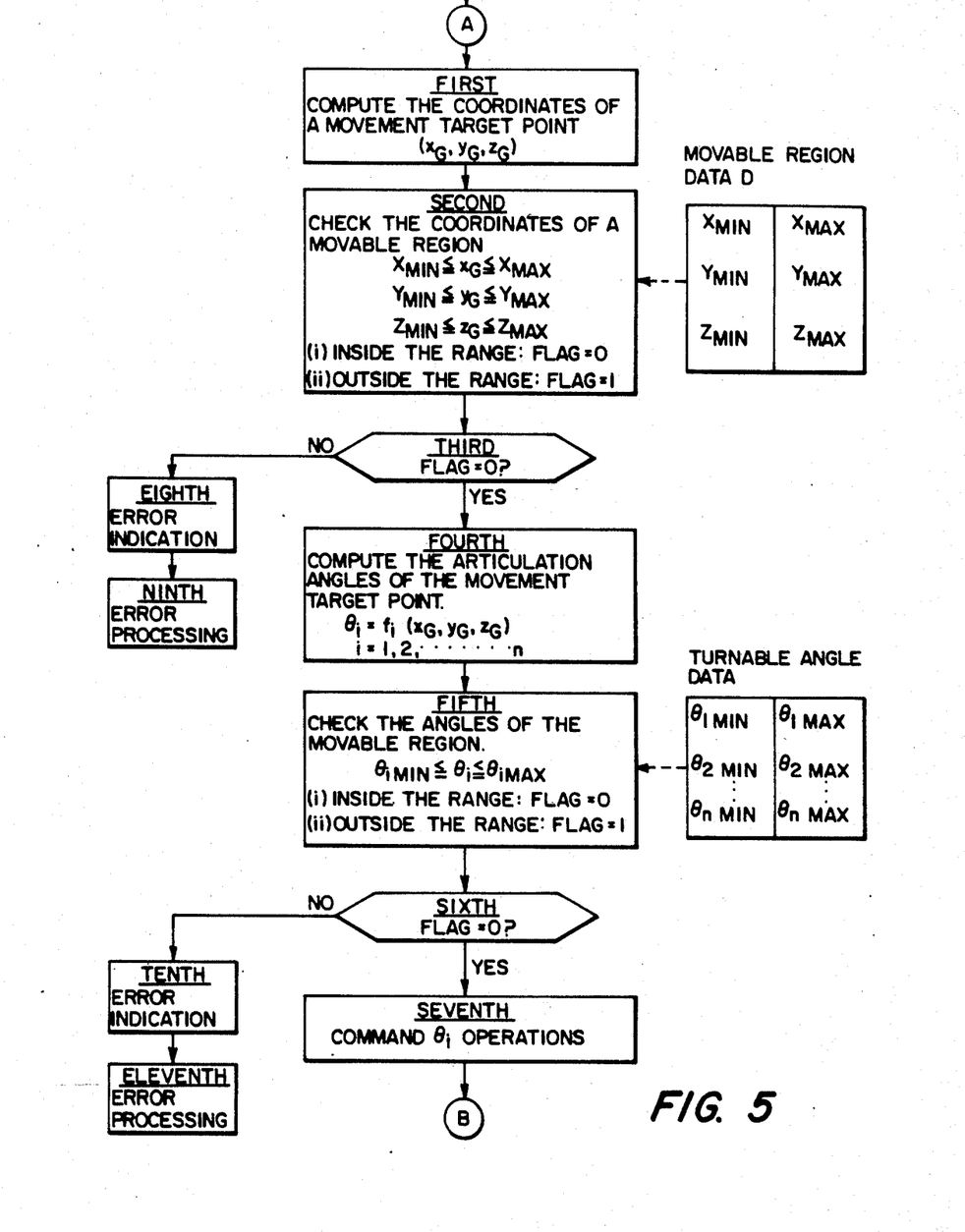
FIG. 5 is a flowchart explaining the operations of an embodiment of the present invention.

Now, the robot control apparatus 1 according to this embodiment is so constructed that movement target position data items are successively given in the teaching operation, playback operation, et cetera of the robot and that processing conforming with a flowchart in FIG. 5 is executed each time the robot proper 5 is to be moved from a certain target position to the next target position.

When the processing of FIG. 5 has been started, the First Step performs computations for converting the next target position data items given at that time, into the data items $x_G$, $y_G$ and $z_G$ of the rectangular coordinate axes.

At the Second Step, the rectangular coordinate axis data D for setting the movable region ($X_{MIN}$, $X_{MAX}$, $Y_{MIN}$, $Y_{MAX}$, $Z_{MIN}$, $Z_{MAX}$) stored in he memory of the control apparatus 1 as described above are read out in advance, and they are compared with the data items $x_G$, $y_G$ and $y_G$ obtained at the First Step. According to the result of the comparison, a flag is set at "0" or "1".

When a result at the Third Step is YES, the processing flow proceeds to the Fourth Step, at which the angles $\theta_i$ of respective articulations corresponding to the next target position are evaluated as functions of the data $x_G$, $y_G$ and $z_G$. The i=5 condition holds in a case where the articulations, namely, turning the axes of the robot, consist of the three principal axes and the two axes of a wrist as in the robot illustrated in FIG. 1.

The Fifth Step reads minimum turning angles $\theta_{i\ MIN}$ and maximum turning angles $\theta_{i\ MAX}$ (called "turnable angle data") preset as being allowed for the respective articulations of the robot proper 5, from a ROM or the like in advance and checks whether or not the angle data items $\theta_i$ obtained in the Fourth Step lie between $\theta_{i\ MIN}$ and $\theta_{i\ MAX}$. In this case, (i=1 to 5) holds as stated above.

The Sixth Step checks the results of the processing of the Fifth Step. When the result has become YES, the processing flow proceeds to the Seventh Step, which gives the actuators of the respective articulations of the robot proper 5 the angle data items $\theta_i$ as commands.

On the other hand, in a case where the result of either the Third or Sixth Steps is a NO, the processing flow proceeds to the Eighth and Ninth Steps or the Tenth and Eleventh Steps, respectively, so as to perform predetermined error indication and error processing.

Such control processing of the robot requires predetermined pre-processing and post-processing before beginning the processing of FIG. 5 and after ending it, respectively. The pre-processing and post-processing in the embodiment of the present invention are the same as in the prior art and are well known, and hence, the detailed description thereof shall be omitted.

Figure 6:
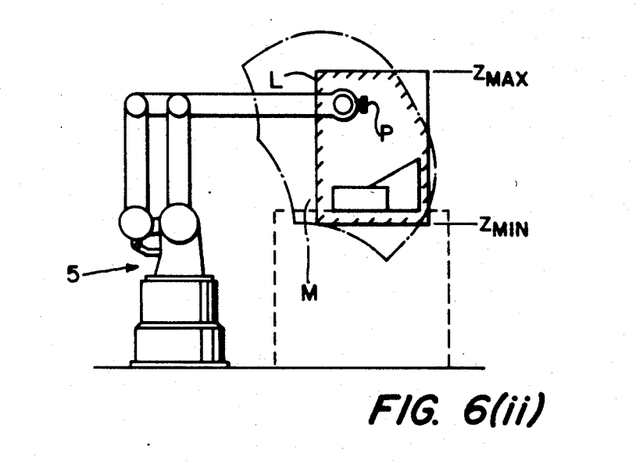
Figure 6I:
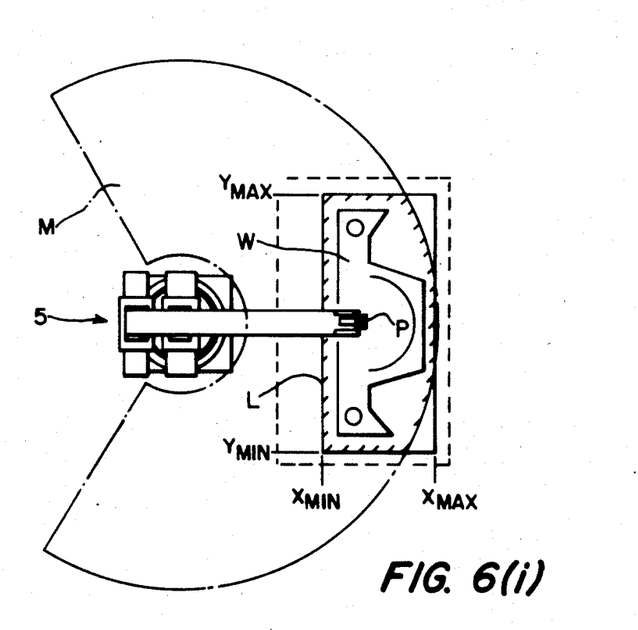

Once the processing shown in FIG. 5 has been run in this manner, the robot proper 5 has its movements confined within a range surrounded with oblique cross-hatching lines in FIGS. 6(i) and 6(ii) and it never moves to a position beyond this range whatever target position data may be given, for example, when the robot proper 5 is to be moved by the use of the teaching console 4 or when a playback control has been performed by the control apparatus 1. In FIGS. 6(i) and 6(ii), symbol W denotes a workpiece.

The movement of the robot proper 5 is first confined within a range L in FIGS. 6(i) and 6(ii) by the processing of the Second and Third Steps, in FIG. 5, and is further confined within a range M in FIGS. 6(i) and 6(ii) by the processing Fifth and Sixth Steps in FIG. 5. Eventually, the movements of the robot proper 5 are confined within the superimposed portion of these ranges L and M, namely, within the range enclosed with the oblique cross-hatching lines. As stated before, the range M at this time is called the "movable region" of the robot proper 5 and is previously determined at the time of the fabrication of the robot by way of example, in accordance with the type of the robot.

Thus, according to this embodiment, the operator can confine the movable range of the robot within a predetermined range at will in advance of the teaching operation or playback operation of the robot. Moreover, the confined movable range at that time can be set at any desired shape, such as the spatial region of a rectangular parallelepiped surrounding the workpiece, which the operator can suppose and recognize intuitively and readily. Therefore, the movement of the robot is conjectured very easily, and even when the robot has operated erroneously due to an erroneous handling, noise or the like, the movement of the robot is held within the conjectured range of the operator at all times. This can eliminate the fear that the operator will be endangered or that the robot will touch another object. To this end, the operator necessarily must supply the movable region data D in advance of the teaching or playback of the robot. For this purpose, a program by which the control cannot proceed to a teaching or the playback operation before input of the movable region data D is completed, may be compiled in control operations to be executed by the control apparatus 1.

In the above embodiment, it has been assumed that the movable region data D necessary for the object workpiece is known beforehand. In this case, the input of the movable region data D can be carried out as the processing of mere numerical information, such as the manipulation of the operating keys 2. Therefore, the control of the robot is simple, and the embodiment can be said to be very effective for jobs.

To this end, however, the data items D need to be prepared for each object workpiece beforehand in accordance with the shape and size of the workpiece, and the layout situation thereof.

In general, even when the shape and size of the object workpiece are known, it is often impossible to set the foregoing movable region without considering also the relations thereof with peripheral equipment. That is, unless the situation of any other device is considered in the environment in which the robot is actually installed, the setting of the movable region is difficult.

On such occasions accordingly, each time the robot is to be used, the movable region data D must be determined in conformity with the situation at that time and be input in accordance with the actual article.

Now, an embodiment of the present invention effective in such case will be described. In the ensuing embodiment, a case where a movable region is a two-dimensional plane, that is, where it is concerned with only the X- and Y-axes of a rectangular coordinate system, will be referred in order to simplify the description. In this case, it is as already explained that, since a range on the Z-axis is limited by the movable region M in FIG. 6(ii) by way of example, no special problem is posed during operation. Alternatively, constant values as predetermined may be input for the Z-axis in advance.

Figure 7:
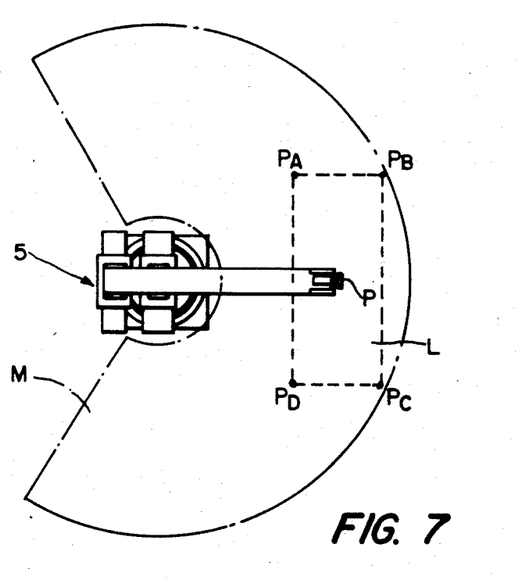
FIGS. 7 and 8 are explanatory diagrams each showing the operation of another embodiment of the present invention.

It is now assumed that, as illustrated in FIG. 7, a movable region L in the rectangular coordinate system intended to be set be entirely included within the movable region M of the robot proper 5 in a horizontal plane.

First, the movable region setting key among the operating keys 3 of the control apparatus 1 is depressed to call and activate the movable region setting function module.

Next, letting points $P_A$, $P_B$, $P_C$ and $P_D$ denote the respective corners of the movable region L to be set, the robot proper 5 is guided to the point $P_A$ by the teaching console 4, and a memory key on the teaching console 4 is depressed. Then, the positional coordinates of point $P_A$ are stored in a memory built in the control apparatus 1. Thenceforth, the robot proper 5 is similarly guided to the points $P_B$, $P_C$ and $P_D$ in succession, and the memory key is depressed at the respective points. Then, the positional coordinates of the respective points are stored.

Thereafter, owing to the storage of the four points, the following processing is executed inside the control apparatus 1, and the movable region on the rectangular coordinate system is determined:

$$X_{MIN} = \text{MIN } |x_A, x_B, x_C, x_D|$$

$$Y_{MIN} = \text{MIN } |y_A, y_B, y_C, y_D|$$

$$X_{MAX} = \text{MAX } |x_A, x_B, x_C, x_D|$$

$$Y_{MAX} = \text{MAX } |y_A, y_B, y_C, y_D|$$

The movable region data items D determined by the above processing are stored in the memory of the control apparatus 1, and are received by the processing portion corresponding to the Second Step in FIG. 5. As seen from the processing, the order of storage may be optional. Moreover, even in a setup wherein four or more points can be taught as in the ordinary case of teaching operating points, any special teaching operation is dispensed with by adding a condition indicating that the points are of the movable region setting data.

In the above description, the example of teaching the four points has been referred to. In principle, however, a setup is also possible wherein the movable region can be set with only the two opposing points of the points $P_A$ and $P_C$ or the points $P_B$ and $P_D$. In this case, the following processing is executed:

$$X_{MIN} = \text{MIN } |x_A, x_C|$$

$$Y_{MIN} = \text{MIN } |y_A, y_C|$$

-continued $$X_{MAX} = \text{MAX } |x_A, x_C|$$

$$Y_{MAX} = \text{MAX } |y_A, y_C|$$

or $$X_{MIN} = \text{MIN } |x_B, x_D|$$

$$Y_{MIN} = \text{MIN } |y_B, y_D|$$

$$X_{MAX} = \text{MAX } |x_B, x_D|$$

$$Y_{MAX} = \text{MAX } |y_B, y_D|$$

As seen from the above description, the process of calculating the minimum values and maximum values of the respective coordinate values can be executed with any number of points not smaller than two, and the corresponding coordinate values are stored in the memory as the movable region data D.

Figure 8:
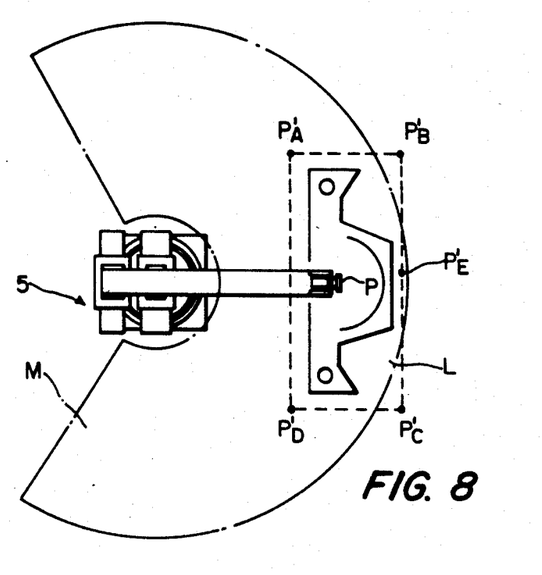

On the other hand, when parts of a movable region L on the rectangular coordinate system intended to be set exceed the movable region M of the robot proper 5 as illustrated in FIG. 8, the robot cannot be guided to points $P_B'$ and $P_C'$ among the respective corner points $P_A'$, $P_B'$, $P_C'$ and $P_D'$ of this movable region L.

In this case, a point $P_E'$ is set at any desired position intermediate between the points $P_B'$ and $P_C'$ of the square movable region L, so as to permit the calculation of the movable region L from the coordinates of this point $P_E'$ and the remaining points $P_A'$, $P_D'$. The robot proper 5 is guided to this intermediate point $P_E'$, the positional data of which intermediate point may be accepted.

In the above, the setting of the movable region L has been explained as being done by assigning a two-dimensional plane. As already explained, however, the setting is also possible by assigning a three-dimensional space. Also in the case of the three-dimensional space, it is unnecessary to say that a movable region can be set by assigning at least three points.

In a case where the movable region data items D necessary for setting the movable region L are input by guiding the robot proper 5, the confinement in the present invention to the movable range of the robot proper 5 has not been performed yet, and the input operation lacks in safety against movement of the robot proper 5 and protection of the robot. However, the positioning of the robot needed at this time does not require a very high degree of precision and may be performed with only several points. The operation can therefore be executed merely by manipulating the teaching console 4 at a sufficient distance from the robot proper 5. Thus, at least any problem on the safety can be avoided.

In the embodiment of FIG. 5, the processing by the Second and Third Steps as performed earlier, thereby to first set the movable region L; the processing of the Fifth and Sixth Steps is subsequently performed to set the movable region M; and the processing of the Fourth Step is performed between them. However, with a measure in which the processing of the Second and Third Steps is performed after the processing of the Fourth Step, even when erroneous operations ascribable to causes such as noise, have arisen in the processing of angle computation, the movement of the robot can be confined within the movable region L, and the safety can be thereby additionally enhanced.

While the articulated type robot has been referred to in the foregoing embodiments, it is a matter of course that the present invention is not restricted thereto, but that it is also applicable to robots of the polar coordinate type, the cylindrical coordinate type and to other coordinate types, equivalent functional effects being expected.

As set forth above, according to the present embodiments, when a robot is to be used, a movable region which differs from a movable region inherent in the robot and which is smaller than the latter movable region can be set at will be supplying numerical information dependent upon a workpiece to-be-handled or in accordance with the actual article through the guide of the robot. Accordingly, when the former movable region is set on, e.g., a rectangular coordinate system separate from an operating coordinate system inherent in the robot, a robot movement space which is readily discernable by an operator can be defined. Visualization of movement of the robot becomes easy, which can achieve great effects in the aspects of the safety of the operator and the protection of the robot. Thus, the disadvantages of the prior art are eliminated, and a control apparatus for industrial robots at high reliability can be provided.

Moreover, the present invention can be performed by utilizing functions ordinarily included in a conventional robot system, substantially as they are, and merely by adding slight functions thereto without the necessity of any special device. Accordingly, a control apparatus for industrial robots which is endowed with a higher degree of safety and reliability and which is low in cost can be easily provided.

I claim:

1. A system for controlling an industrial robot of the type having a driving joint for performing rotational motions and operating regions defineable between minimum and maximum angles along distinct axes, comprising:

memory means for storing minimum and maximum values of coordinates along distinct axes in a first coordinate system as first data defining a movable region over which the robot is to be operational, and for storing minimum and maximum values of articulation angles along distinct axes as coordinates in a second coordinate system as second data;

processor means for receiving said first and second data and coordinates in said first coordinate system of a series of target points defining movement of the robot, for generating a first indication if said target points are within said movable region defined by said first data, for, upon generation of said first indication, converting said target points into operating angles along said distinct axes over which driving joints of the robot are to provide rotational motion to drive the objective of the robot between said target points, for generating a second indication if said operating angles exceed said minimum and maximum values of said articulation angles, and for, upon generation of said second indication, transmitting said operating angles and thereby defining third data representing an optional region of the objective of the robot, said optional region being within said movable region and having a shape and size determined by said target points and the movable region; and means having storing means for receiving said third data provided from said processor means, for controlling the objective of the robot in response to said data to confine movement of said objective to said optional region during an operational mode of the robot.

2. The system of claim 1, wherein said processor means defines said third data by representing said optional region as a three-dimensional space in said first coordinate system and said first coordinate system is a rectangular coordinate system.

3. The system of claim 2, wherein said first data includes a maximum and a minimum value on each coordinate axis defining the three-dimensional space.

4. The system of claim 2, wherein for each of said distinct axes not constrained by said minimum and maximum values of coordinates stored in said memory, said processor means automatically supplies minimum and maximum values of coordinates within said movable region in said first coordinate system to said memory means as part of said first data.

5. The system of claim 1, further comprised of a teaching console for guiding the objective of the robot to a desired position, said processor means suppling the positional coordinates of said objective to said storing means as said data when said objective is guided by said teaching console to the points defining said movable region of said objective.

6. The system of claim 1, wherein said storing means modifies said third data representing intermediate points of an inner position within said movable region when said points set by said processor means are outside of said movable region, and said control means calculates the movable region based on the modified said third data representing said intermediate points.

7. The system of claim 1, further comprised of means for preventing operation of the robot in response to said third data before said defining means sets said data representing said movable region.

8. The system of claim 1, wherein said optional region represents the minimum values and maximum values of a movable region of the objective of the robot in said storing means and said processor means includes:
means for computing the coordinates and the articulation angles of a proposed target point of said objective;
means for determining whether the value of said coordinates are between said minimum values and said maximum values, and the values of articulation angles are between minimum turning angles and maximum turning angles representing said movable region are preset for the articulation of the robot; and
means for providing said articulation angles to an actuator of the robot.

9. The system of claim 8, wherein said turning angles represent a superimposed portion of ranges defined by said optional region and said movable region and are provided to said determining means to limit movement of said objective to said superimposed portion.

10. A method for controlling an industrial robot, comprising:
defining data including minimum values and maximum values representing a movable region of the objective of the robot, in a storage medium;
computing the coordinates of a target point for said objective;
checking to determine whether the values of said coordinates are between said minimum values and said maximum values;
computing the articulation angles of said target point for said objective;
checking to determine whether the values of said articulation angles are between minimum turning angles and maximum turning angles preset for the robot; and
after checking said values, providing said articulation angles obtained to an acuator controlling movement of the objective.

11. The method of claim 10, further comprising:
defining in a storage medium a movable region over which an optional region for the objective of the robot;
computing the coordinates of a successive target point of said objective;
checking to determine whether the values of said coordinates of said successive target point are between said minimum values and said maximum values;
computing the articulation angles of said successive target point of said objectives after checking values of said coordinates of said successive target point;
checking to ascertain whether the values of said articulation angles of said successive target point are between minimum turning angles and maximum turning angles preset for the robot.

12. The method of claim 11, further comprised of preventing the controller of the robot from proceeding to another step before completion of said defining step.

13. The method of claim 11, wherein each checking step is performed after the processing of a corresponding computing step.

* * * * *